Sept. 8, 1970 E. L. ALPEN 3,527,536
MICROSPECTROPHOTOMETER DEVICE
Filed March 8, 1967 3 Sheets-Sheet 1

INVENTOR
EDWARD L. ALPEN
BY
Charles F B Curry

INVENTOR
EDWARD L. ALPEN
BY

INVENTOR
EDWARD L. ALPEN
BY
Charles +3 Curry

United States Patent Office 3,527,536
Patented Sept. 8, 1970

3,527,536
MICROSPECTROPHOTOMETER DEVICE
Edward L. Alpen, Burlingame, Calif., assignor to the United States of America as represented by the Secretary of the Navy
Filed Mar. 8, 1967, Ser. No. 621,716
Int. Cl. G01n 21/26; H01j 31/50
U.S. Cl. 356—72                         1 Claim

ABSTRACT OF THE DISCLOSURE

An optical unit comprising a light source, a filter system, a movable stage and a microscope that are mounted on stabilizing platforms and adjustable stages. The stabilizing platforms and adjustable stages provide a high degree of flexibility and precise adjustment for the components mounted thereon. The object being investigated may be observed directly with the optical unit or with a photometer head, photomultiplier, and electronic unit combined with the optical unit. The photometer head provides variable selection of fields of view and either visual or electronic observation of the object. The electronics unit includes a variable current to voltage conversion system that provides a common reference when different fields are selected by the photometer head.

---

The invention described herein may be manufactured and used by or for the Government of the United States of America for governmental purposes without the payment of any royalties thereon or therefor.

The present invention relates to a measuring device and more particularly to a device for the measurement of substances which absorb light in the visible or ultraviolet regions.

Perhaps the most fundamental area of scientific investigation and interest is the acquisition of greater knowledge about the living cell and especially about the events and characteristics that exist during the generation cycle or dividing period of the living cell. This division process is the fundamental mechanism required for all living matter. However, the acquisition of precise information about the living cell during its division process has been limited largely by the unavailability of equipment capable of measuring and recording with high precision the events and characteristics. Accordingly, there has been a continuous interest in the development of instruments and methods that are capable of precisely measuring and recording these events and characteristics. One method previously used for this purpose is referred to as the "cycotophotometric method" which uses light absorption to determine the characteristics of matter. This method has been found to be particularly useful for the measurement of the DNA (deoxyribose nucleic acid) content which occurs in living cells. DNA, which is also referred to as chromatin, is a protoplasmic material largely consisting of protein compounds and nucleic acid that occurs in the nucleus of cells and exists as a group of extremely small granules and is generally regarded as the physical basis of heredity. Of particular investigative interest are chromosomes, which are small bodies into which the DNA of a cell nucleus resolves itself during the division process.

In order to appreciate the difficulties encountered in measuring the size and weight of DNA and chromosomes it should be noted that the DNA of a single cell has an average cross sectional size of about $10\mu$ ($10 \times 10^{-6}$ cm.) and a weight of about 20 $\mu\mu g$. ($20 \times 10^{-12}$ grams) and the chromosomes formed from the DNA of a single cell have a cross sectional size ranging from about $.5\mu$ to $2\mu$ and a weight of about 1 $\mu\mu g$.

The two wave length theory employed in the present invention is based on the use of apparatus consisting of a light source, monochromator, miscroscope and photomultiplier in the projection path of the microscope. The cell or a part thereof is the field and is positioned to receive light which is transmitted to the photomultiplier. The transmittance of the field for one light frequency is given by the expression $$T_{T\lambda 2} = T_{A\lambda 2} + T_{(1-A)\lambda 2}$$

where $T_{T\lambda 2}$ is the transmittance (dimensionless) at a light wave length $\lambda_2$, $T_{A\lambda 2}$ is the transmittance of only the media containing the chromosome, $T_{(1-A)\lambda 1}$ is the transmittance of the media and the chromosome contained in the media, and A is the area of the total field.

The transmittance of the field for a different light frequency is given by the expression $$T_{T\lambda 2} = T_{A\lambda 2} + T_{(1-A)\lambda 2}$$

where $T_{T\lambda 2}$ is the transmittance (dimensionless) at a light wave length $\lambda_2$, $T_{A\lambda 2}$ is the transmittance of only the media containing the chromosome, $T_{(1-A)\lambda 1}$ is the transmittance of the media and the chromosome contained in the media, and A is the area of the total field.

Since the media of the cell in which the chromosome is contained is virtually clear, the transmittance of the media may be considered the same at the two wave lengths $\lambda_1$ and $\lambda_2$. Therefore, $$T_{A\lambda 1} = T_{A\lambda 2}$$

A typical measured value of $T_{T_1\lambda}$ may be about 98.4%, and a typical measured value of $T_{T\lambda 2}$ may be about 98.2%. If the signal to noise ratio or signal stability of the instrument is about .01, which has been the case with previous instruments, then the measured values of $T_{T\lambda 1}$ (.984) and $T_{T\lambda 2}$ (.982) are of very little value since the instrument can measure only to the second place and not the third place which contains the variation $$(.984 - .982 = .002)$$

Accordingly it is essential that the instrument be able to measure in the third place and have a signal stability of at least .001.

Brieflly, one embodiment of the present invention is an optical unit comprising a light source, a monochromator system, a movable stage and a microscope. The object to be investigated is positioned in the microscope field and receives light from the light source. Stabilizing platforms and mounting stages are provided for the individual components of the optical unit and provide a high degree of flexibility and precise adjustment of these components. In another embodiment of the present invention a photometer head and photomultiplier are placed in the projection path of the microscope of the optical unit. The output of the photomultiplier is applied to an electronic unit that provides information concerning the object being investigated. The photometer head has two primary functions. The first is to provide a variable selection of fields of view of the object being investigated. The second provides for selection of either visual or electronic observation of the object being investigated. A unique common reference selection system is provided between the photometer head and the electronic unit when different fields are selected by the photometer head. This common reference selection is achieved by an adjustable electronic current to voltage conversion system in the electronic unit which makes it possible to obtain an electronic reading of the photomultiplier output signal immediately after a change in field size and a change to the common reference. This is accomplished without changing the power or light intensity supplied to the photomultiplier which would require long time periods of photomultiplier or lamp stabilization.

Accordingly, an object of the present invention is to provide a device that reduces to a minimum all possible sources of optical, mechanical or electronic errors heretofore encountered in measuring the transmittance of a field containing extremely small objects.

Other objects and many of the attendant advantages of this invention will be readily appreciated as the same becomes better understood by reference to the following detailed description when considered in connection with the accompanying drawings wherein.

Figure 1:
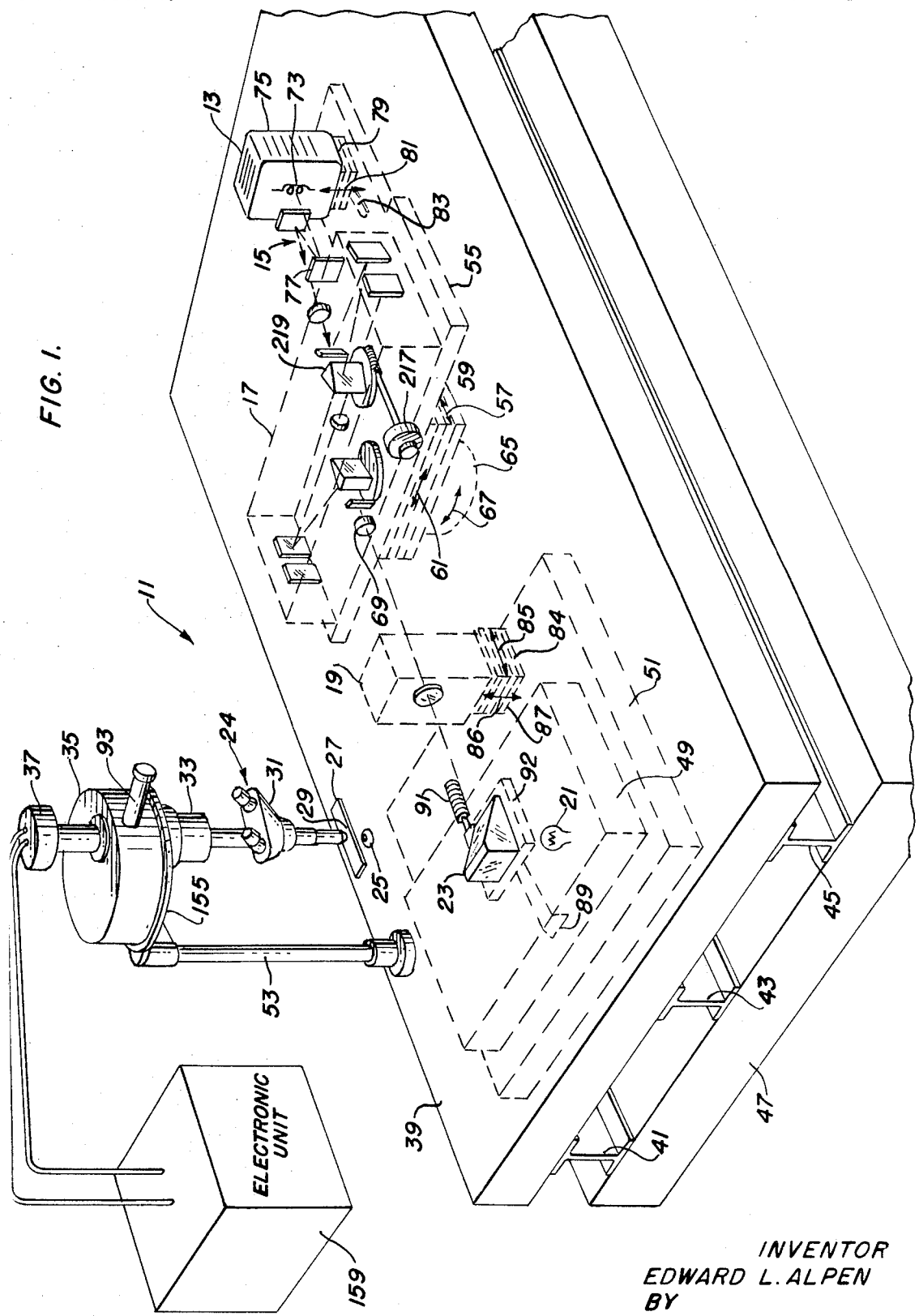
FIG. 1 is a schematic diagram of the measuring device of the present invention.

In FIG. 1 is illustrated a schematic diagram of measuring device 11 of the present invention. The basic components comprising this measuring device are light source 13, entrance optics 15, monochromator 17, monochromator condensing system 19, light source 21, movable prism 23, microscope condenser 25, microscope stage 27, object to be viewed 29, trinocular head 31, transition piece and shutter 33, photometer head 35 and photomultiplier 37.

One of the most difficult problems in any measurement at high magnification is the elimination of vibration or movement of the image relative to the plane of measurement. Either of two basic approaches may be used to overcome this problem: isolation by fluid damping; or the massive and rigid interconnection of the various components. The latter approach is preferably used since it is more trouble-free and reliable provided it is properly made. The unique support system of the various components of measuring device 11 preferably comprises an aluminum base plate 39 which is supported by three I-beams 41, 43 and 45 resting on a heavy maple block table 47. The microscope support is fabricated from an aluminum microscope support plate 49 which is mounted on base plate 51. Photometer head 35 is supported by a vertical steel rod 53 that is mounted on base plate 39.

Monochromator 17 is the double prism type and has a high relative aperture, front surface mirror optics and interchangeable prisms. The monochromator is mounted on a heavy aluminum plate 55 that is in turn mounted on stage 57 which may be adjusted in the X and Y directions, as indicated by arrows 59 and 61 respectively, by two micrometers, not shown. Stage 57 is mounted on stage 65 which may be adjusted about a vertical rotational axis, as indicated by arrow 67, and locked in position to maintain the alignment of the optical axis of exit slot 69 with prism 23 and the entrance face of the illumination system of microscope 24.

Light source 13 and entrance optics 15 are supported by plate 55. The illuminating element 73, preferably a quartz iodine lamp which illuminates in the visible region, is mounted in the vertical position in housing 75. The housing is fitted with no optics but maintains a stable, drift-free environment around the lamp and collimates the light to fill entrance mirror 77 and reduces scattered illumination. The lamp is adjustable virtically or in the Z direction by stage 79, as indicated by arrow 81, to correct for variation in filament position among different lamps. Focusing light source 13 relative to entrance mirror 77 is achieved by a horizontal dove-tail track 83 and micrometer adjustment, now shown. A hydrogen lamp may be used in place of the quartz iodine lamp if it is desirable to illuminate the object in the ultraviolet region. Mounted on microscope support plate 49 are light source 21 and movable prism 23. Mounted on base plate 51 are microscope support plate 49 and stage 84. Monochromator exit condensing system 19 is directly supported by stage 84 which is movable in three directions, X, Y and Z, as indicated by arrows 85, 86 and 87. In monochromator exit condensing system 19, for visible light a f4.5/150 mm. photographic lens is preferably used and for ultraviolet light a quartz doublet f1.5/190 mm. lens is preferably used. The monochromator condensing system also employs an iris diaphram, not shown, to act as a field stop.

Microscope support plate 49 is provided with a 45° movable prism 23 having the front surface of the long face aluminized. This prism may be withdrawn, replaced or adjusted by sliding along dove-tail slot 89. The position of prism 23 is controlled by micrometer adjustable stop 91. Light source 21 is mounted in microscope support plate 49 and transmits light, through an opening in support plate 49, and is received by microscope 24 when prism 23 is withdrawn from adjustable stop 91.

A conventional microscope 24 is employed that preferably has a trinocular head 31, a single, sliding and centerable objective holder and a 1.4 achromatic-aplanatic condenser 25, all of which are mounted by conventional holding mechanisms, not shown, which are directly attached to microscope support plate 49.

One of the most critical features of the present invention is photometer head 35 which has photomultiplier 37 mounted on the top thereof and along the optical axis of microscope 24. Basically, photometer head 35 allows the choice of an optical pathway directed either at side viewing telescope 93 or at photomultiplier 37. It also provides a unique selection system of variable sized apertures for choice of the size of the photometric field desired.

Figure 2:
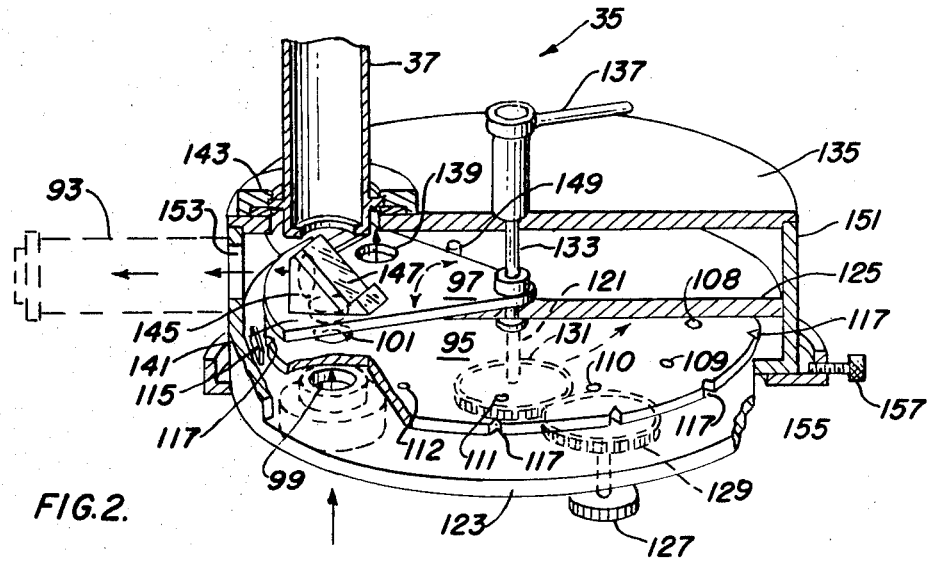
FIG. 2 is an isometric view in partial section of the photometer head of the present invention.
Figure 3:
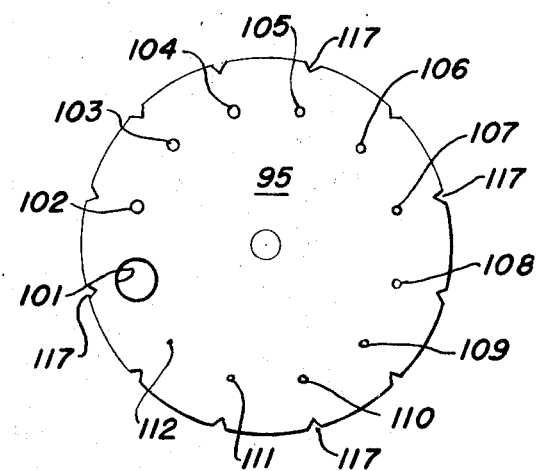
FIG. 3 is a top elevation of the aperture disk of the photometer head of FIG. 2.
Figure 4:
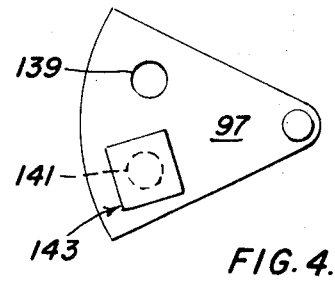
FIG. 4 is a top elevation of the sector disk of the photometer head of FIG. 2.

Referring to FIGS. 1 through 4 the body of photometer head 35 is preferably made of aluminum and includes aperture disk 95 and sector disk 97 that are spaced apart and independently rotable. Aperture disk 95 is positioned immediately above exit pupil 99 of transition piece 33 and has a plurality of apertures 101 through 112 located around its periphery as best depicted in FIGS. 2 and 3. The first aperture, 101, is made large, about .75 inch, to provide an unobstructed view of the field microscope. The other apertures, 102 through 112, are progressively smaller and define progressively smaller photometric fields. In the preferred embodiment apertures 102 through 112 have the following diameters in millimeters, 4.069; 3.423; 3.020; 2.510; 2.326; 2.222; 2.068; 1.888; 1.786; 1.394 and 1.104. However, it is to be understood that, depending upon the need, a lesser or greater number of apertures may be employed and the size of these apertures may depart from those defined above. In order to achieve the greatest possible centration of the photometric field to the optical axis, apertures 101 through 112 are preferably line bored after photometer head 35 is assembled and after aperture disk 95 is fixed at each of the respective apertures by the interaction of locking mechanism 115 with V-slots 117. Aperture disk 95 is mounted on shaft 121 between lower plate 123 and intermediate plate 125 and is rotated by withdrawing locking mechanisms 115 from V-slot 117 and rotating nob 127 that is attached to gear 129 which meshes with gear 131 which is directly attached to shaft 121.

Sector disk 97 is mounted on shaft 133 (which is independent from shaft 121) between intermediate plate 125 and upper plate 135 and is rotated by shaft 133 by means of handle 137. Formed in sector disk 97 are openings 139 and 141, shown in dotted lines, which are sufficiently large to permit unimpeded transmission of light from exit pupil 99 to either photomultiplier 37 or side viewing telescope 93 when openings 139 and 141 are respectively positioned over exit pupil 99. Prism 143 is mounted on sector disk 97 directly over opening 141 and comprises a brass base 145 which is bored through at right angles and a front surface mirror 147 which is mounted on the long surface of brass base 145. Stop 149 positions opening 141 and prism 143 directly over exit pupil 99 and another stop, not shown, positions opening 139 directly over exit pupil 99. When opening 139 is positioned over exit pupil 99 the light transmitted through microscope 24 is received by photomultiplier 37 and when prism 143 is positioned over exit pupil 99 the light transmitted through the microscope is received by side viewing telescope 93.

Lower plate 123, intermediate plate 125, upper plate 135 and telescope 93 are connected to cylindrical member 151 which has an opening 153 transmits light to telescope 93. The periphery of lower plate 123 rests against support ring 155 which has adjustment screws 157 for aligning photometer head 35 with exit pupil 99. As best depicted in FIG. 1 photometer head 35 is supported by base plate 39 through steel rod 53 that is connected to support ring 155. In addition, disposed between photometer head 35 and microscope 24 is transition piece 33 that includes a shutter and a light baffle. The light shutter is particularly useful for dark current measurement in the detection system as will be hereinafter explained.

In the preferred embodiment of the present invention the complete light path from light source 13 to detector or photomultiplier 37 is free of ultraviolet absorbing glass elements and, therefore, the change from visible light to ultraviolet light photometry requires only the replacement of light source 13, the optics of monochromator 17, the optics microscope 24 and the detection element (scientillator) of photomultiplier 37.

Figure 5:
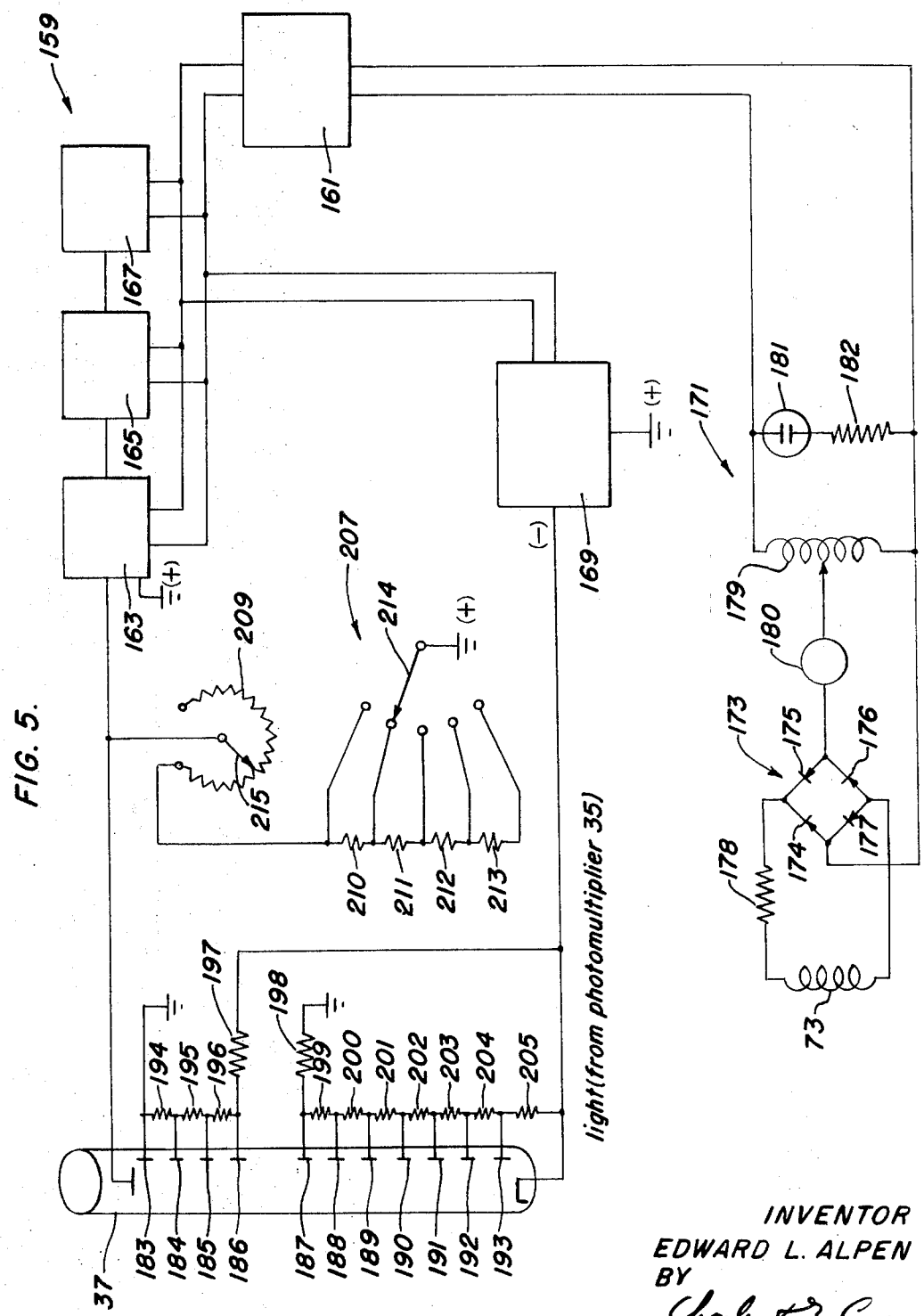
FIG. 5 is a schematic diagram of the electrical circuits of the present invention.

In FIG. 5 are schematically illustrated the electronic circuits of electronic unit 159 of the present invention. A regulated AC power supply 161 supplies AC power to buffer amplifier 163, non-linear systems digital voltmeter 165, non-linear systems data printer 167, variable DC supply 169 and light source power supply 171. Preferably, power supply 161 provides a regulated output voltage at full load having a maximum variablity of 0.1%.

Light source power supply 171 provides power to illuminating element 73 through full wave rectifying bridge network 173 that includes diodes 174 through 177 which, in view of the relatively large power consumption and stability requirements, are preferably mounted on a large heat sink and fan cooled. Resistor 178 is a ballast resistor and serves to drop the operating voltage to that required by illuminating element 73. The voltage applied to illuminating element 73 may be varied by variable transformer 179 the output of which is measured by voltmeter 180 which indicates the light output or intensity of illuminating element 73. Diode 181 and resistor 182 serve to limit the line voltage applied to transformer 179.

Photomultiplier 37 may be many different types; however, one type that was found particularly satisfactory is EMI type 9524–S, having eleven dynodes 183 through 193 and high gain and low noise characteristics (dark current). The rated dark current for this tube is 1.0 to 1.5 nanoamperes at the rated voltage of about 1500 volts. However, careful selection can provide tubes with much lower dark current and the tube may be operated at a voltage substantially less than rated, for example, 900 to 1,200 volts, and thereby reduce the dark current to an even greater extent. Power is supplied to photomultiplier 37 from variable DC power supply 169 through resistors 194 through 205. The current gain of photomultiplier 37 is very large, for example, for the above-described photomultiplier it is the sixth power of the applied voltage. Therefore, it is very important that DC power supply 169 have extremely high stability, that photomultiplier be very carefully selected for low dark current, and that the other circuits and components of the system do not introduce excessive error signals.

It should be particularly noted that photomultiplier 37 is basically a current device. That is, light or photons are introduced at the input end of the photomultiplier and are converted into electron energy by impinging on a scientillator located at the input end of the photomultiplier. These electrons, which comprise the electric current, are multiplied at each stage or dynode of the photomultiplier. The degree of multiplication is principally determined by the differential voltage applied between adjacent photomultiplier stages.

As previously described, photometer head 35 provides for the selection of different fields of view. For practical operation and use of the information about the object being viewed it is necessary to adjust the output of digital voltmeter 165 to read the same value when viewing clear fields of different sizes as determined by the particular selection of apertures 102 through 112 of photometer head 35. This may be achieved in two different conventional ways. First, the applied voltage to be dynodes of the photomultiplier may be varied to increase or decrease the multiplication factor to correct the new aperture to a common reference value. Second, the light intensity may be varied by varying the intensity of illuminating element 73 to correct the new aperture to a common reference value. However, each of these approaches requires that the photomultiplier be operated in a new mode and experiments have shown that it requires about 20 minutes for the photomultiplier to become stabilized each time the system is corrected to a common reference value. While permissible for some applications, this time delay is unacceptable for many applications especially when hundreds of measurements must be made during a twenty-four hour time period.

Accordingly, a unique system has been developed for current to voltage transformation of the output signal from photomultiplier 37. This is achieved by resistive network 207 and buffer amplifier 163. Resistive network 207 comprises variable resistor 209 and fixed resistors 210 through 213. It is to be understood that the number of fixed resistors or their ohmic values, or both, may be varied in accordance with the particular need as determined by the types of components used in measuring device 11 or their operating parameters, or both. However, in one embodiment of the present invention variable resistor 209 in a 2 megohm, 40 turn helipot, and each of resistors 210 through 213 is one megohm. By appropriate selection in the stepped series of resistors 210 through 213, by selecting arm 214, and the fine adjustment of variable resistor 209, by selecting arm 215, it is possible to adjust to a common reference value by adjusting the reading of digital voltmeter readout to 1.000 volt when there is no object in the photometric field that impedes the transmission of light. Referring to FIG. 1, when the entire viewed field of light from light source 13 is the background media in which the object is located on microscope stage 27, then the digital voltmeter readout is selected to read 1.000 volt by appropriate adjustment of resistors 209 through 213. It should be noted that the background field may be any ambient media such as a vacuum, air, fluid or the cell material surrounding the chromosomes, or the like. When the object is then placed in the field, the voltmeter reads directly the ratio $I/I_0$ where $I$ is the light transmitted through the viewed field when the viewed field comprises only the ambient media and $I_0$ is the light transmitted through the viewed field when the viewed field comprises the ambient media and the object being investigated. It can therefore be seen that the actual sensitivity, variation of the multiplication factor or variation of the intensity of input light to the photomultiplier, is not changed by adjustment of resistive network 207. This is particularly important since variation in the actual sensitivity of the photomultiplier would require the photomultiplier to stabilize over a relatively long period of time. The use of resistive network 207 permits rapid adjustment of the apparent relative intensity at the input and output of buffer amplifier 163 and at the output of digital voltmeter 165.

A typical example of operation of the measuring device of the present invention is as follows. Assuming it is desirable to measure the characteristics of relatively large objects, then a large aperture, for example aperture 102 of aperture disk 95 of photometer head 35, is positioned directly over exit pupil 99. While viewing only the media surrounding the object and using light of a first frequency, as selected by monochromator 17, resistors 209 through 213 of resistive network 207 are selected so the output voltage of digital voltmeter 165 is set at a predetermined common reference value, for example 1.000 volt. Then, while using the same frequency light and the same aperture 102, the object is positioned in the field and another reading is made by digital voltmeter, for example 0.984 volt. Next, while using the same aperture 102 and the same object, a different or second frequency light is selected by monochromator 17 and another reading is made by the digital voltmeter, for example 0.982 volt. Although not essential, data printer 167 is provided to automatically record the output of digital voltmeter 165.

Assuming it is now necessary to measure the characteristics of an object having a smaller size than the relatively large sized object viewed through aperture 102, then a smaller aperture, for example aperture 111 of aperture disk 95 may be used. When this change is implemented, the reference output voltage of digital voltmeter 165 will decrease and a common reference voltage between the two objects being measured is therefore not available. In order to provide a common reference voltage, resistors 209 through 213 of resistive network 207 are selected so that the output voltage of digital voltmeter 165 is at the previously determined common reference value of 1.000 volt. This common reference voltage selection is made while viewing only the media surrounding the object while using a light source having the first frequency. Then while using this same frequency light and aperture 111, the object is positioned in the field and another reading is made by digital voltmeter, for example 0.963 volt. Next, while using aperture 111 and the object positioned in the field, the second frequency light is selected by monochromator light 17 and another reading is made by digital voltmeter 165, for example .960 volt.

Prior to the utilization of resistive network 207 and buffer amplifier 163, in order to achieve a common reference voltage it would have been necessary to vary either the voltage applied to dynodes 183 through 193 by varying the output of DC voltage supply 169 and or by varying the light intensity of light source 173 by varying the output voltage of variable transformer 179 of light source power supply 171. Each of these approaches require considerable delay time for stabilizing the photomultiplier.

One of the functions of sector disk 97 is to permit viewing the field through side viewing telescope 93 while prism 143 is positioned directly over pupil 99. In this manner it is possible to conveniently and very accurately determine whether all or part of the object is located within the field and whether or not it is desirable to use either a larger or smaller aperture to achieve the maximum contrast between the ambient field and the object located in the ambient field.

It should be noted that the light transmitted to the field from light source 13 is of relatively low intensity and it is therefore difficult to locate the object or cell by either side viewing telescope 93 or trinocular head 31 during the alignment process. Therefore, light source 21 and movable prism 23 provide high intensity light background that makes it possible to clearly observe an extremely small object and field. This is achieved by sliding movable prism 23 away from micrometer adjustable stop 91 to permit visible light from light source 21 to pass through the field and optical axis of microscope 24. After the object has been clearly identified and aligned correctly, movable prism 23 is then inserted against micrometer adjustable stop 91 so that light from light source 13 will be then reflected from the mirror surface of prism 23 through the field and optical axis of microscope 24. It should be noted that monochromator 17 is provided with an adjustment nob 217 which rotates prism 219 to select the particular light frequency desired.

Buffer amplifier 163 functions to maintain a constant output impedance applied to the input of digital voltmeter 165 irrespective of changes in voltage and changes in impedance applied to the input of buffer amplifier 163. This is necessary to achieve optimum power gain, stability and accuracy of the digital voltmeter. An emitter follower transistor configuration is used in buffer amplifier 163 to maintain a relatively low value and nearly constant output impedance from buffer amplifier. Since photomultiplier 37 has a large current gain there is a relatively large voltage and voltage change across resistive network 207 that is applied to buffer amplifier 163 which makes it possible to use a unity voltage gain emitter follower configuration in the buffer amplifier and thereby achieve the desired impedance results. This constant impedance matching is desirable each time a different aperture setting is selected and a common reference voltage is obtained since there would otherwise be different high input impedances applied to the input of the digital voltmeter. That is, assuming the output current from photomultiplier 37 is decreased by a factor of 2 while going from aperture 102 to aperture 111, then the resistance of resistive network 207, through appropriate selection of resistors 209 through 213, must be increased by a factor of 2 in order to achieve a constant voltage drop across resistive network 207 of, say, 1.000 volt for each of these two aperture settings. Therefore, buffer amplifier 163 isolates the impedance of resistive network 207 from digital voltmeter 165 and the digital voltmeter will see only the output impedance of the emitter follower network of buffer amplifier 163 irrespective of voltage swings or impedance swings of the resistive network.

In view of the foregoing it can be seen that a measuring device is provided that is particularly useful for measuring the chromosome content of biological materials at the microscopic level. It will be appreciated that this device may be used to measure the characteristics of many different types of matter and is not limited to measuring the characteristics of biological matter. Also the device may be used with single wavelength or multiple wavelength light, such as visible light, and is not limited to a two-wave length system. Furthermore, the apertures used in the photometer head may comprise many different sizes and shapes such as squares, rectangles, triangles, ovals or different irregular shapes. For example, in certain embodiments of the present invention it is desriable to shape the apertures similar to the shapes of the objects being investigated. In this manner optimum contrast of the output readings of the measuring device is achieved. It will also be appreciated that different electric circuits may be employed provided they perform in a manner consistent with the above-described objectives and are compatible with the optical unit and photometer head.

What is claimed is:
1. A measuring device comprising:
   a light source, a light filter system, a sample holder, a microscope, a photometer head and a photomultiplier tube arranged in optical alignment;
   said photometer head including a rotatably mounted aperture disk having a plurality of progressively larger apertures located about its periphery for selecting different sized fields of view of the field of view of said microscope;
   said photomultiplier tube positioned to receive light transmitted through the aperture of said photometer head:
   the output of said photomultiplier tube connected to the input of a buffer amplifier and to the input of a resistive network;
   said resistive network having a plurality of resistors that are selectable for maintaining a constant voltage drop across the resistive network when the aperture size of said photometer head is changed;

a voltage measuring device;

the output of said buffer amplifier being connected to the input of said voltage measuring device;

a telescope operatively mounted on said photometer head;

said photometer head including a rotatable mounted sector disk for selectively transmitting light from said microscope to said photomultiplier tube or for transmitting light from said microscope to said telescope.

said photometer head comprising a housing having a cylindrical side and top, intermediate, and bottom circular plates attached thereto;

said aperture disk being rotatably mounted between said bottom and intermediate plates; and said sector disk being rotatably mounted between said intermediate and top plates.

References Cited

UNITED STATES PATENTS

| | | | |
|---|---|---|---|
| 1,895,853 | 1/1933 | Kennedy | 356—224 |
| 2,326,878 | 8/1943 | Muller | 356—189 X |
| 2,790,945 | 4/1957 | Chope | 330—144 X |
| 2,885,926 | 5/1959 | Molloy | 356—187 |
| 2,091,762 | 8/1937 | Kuppenbender | 356—219 |
| 2,261,498 | 11/1941 | Karcher | 356—96 X |
| 2,424,858 | 7/1947 | Senn | 356—708 X |
| 2,756,626 | 7/1956 | Lansing, et al. | 356—201 X |
| 2,879,691 | 3/1959 | Faulhaber | 356—224 X |
| 3,316,409 | 4/1967 | Rockwell | 250—214 |

FOREIGN PATENTS 285,194  8/1952  Switzerland.

OTHER REFERENCES

Hilger, Recording Infra-red Spectrophotometer, p. 5, August 1955, 356—96.

Venetta, Rev. Sci. Inst., "Microscope Phase Fluorometer," v. 30, No. 6, June 1959, pp. 450–457, 356-98.

Chance et al, Rev. Sci. Inst., "Microspectrophotometer," v. 30 No. 8, August 1959, pp. 735–741, 356—96.

Falta, Jena Review, No. 3, 1960, p. 120.

Wagener et al., Rev. Sci. Inst., ". . . . Microspectrophotometer," v. 34, No. 5, May 1963, pp. 540–544, 356—96.

Millman et al., Pulse & Digital Circuits, McGraw-Hill, (New York, 1956), pp. 564–567.

RONALD L. WIBERT, Primary Examiner

W. A. SKLAR, Assistant Examiner

U.S. Cl. X.R.

250—214; 356—201